Figure 5:
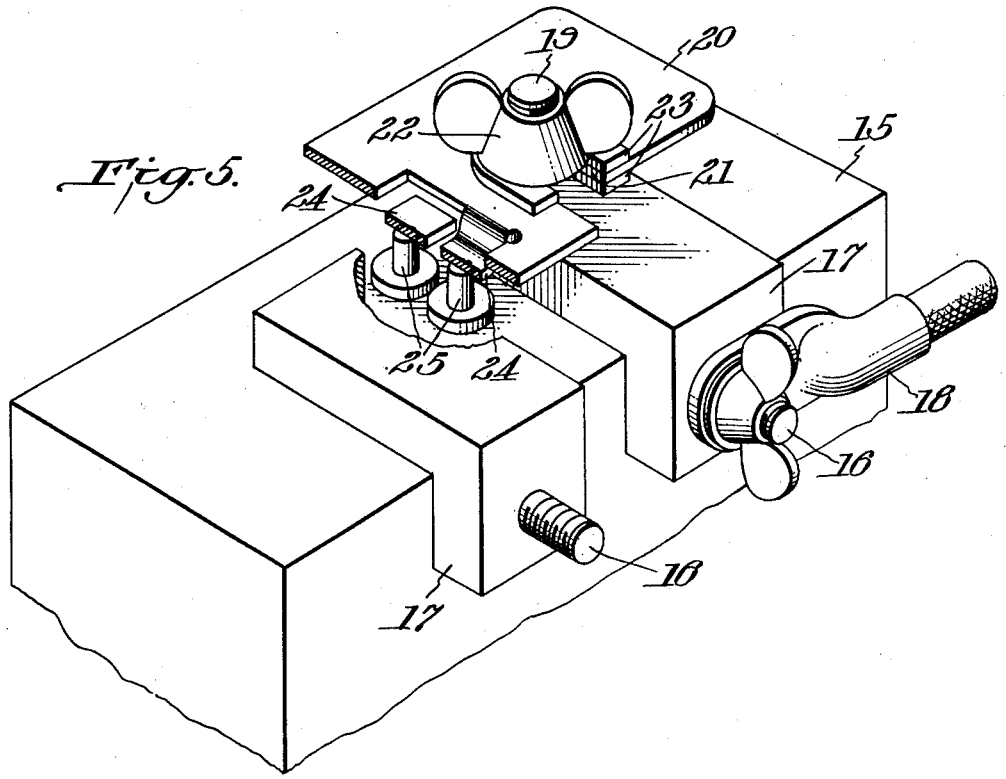

March 20, 1934.  K. M. LEDERER  1,951,799
AMMETER
Filed July 6, 1932  3 Sheets-Sheet 1
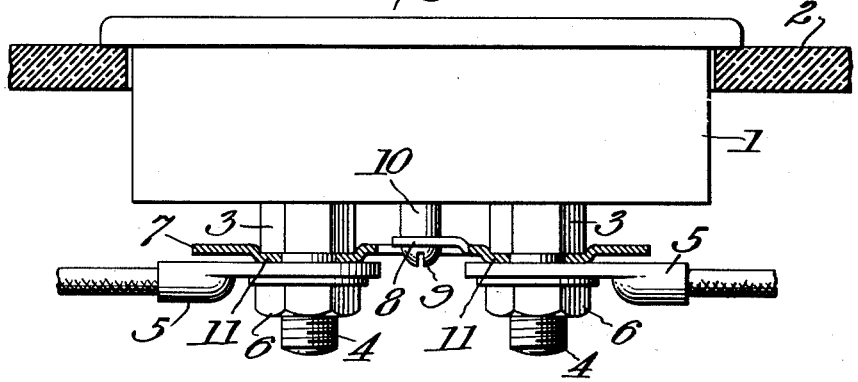
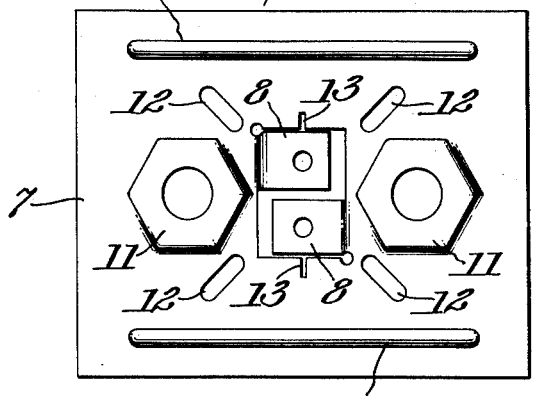 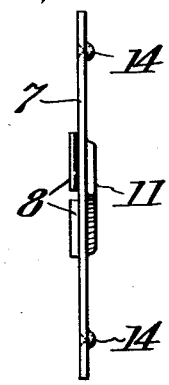
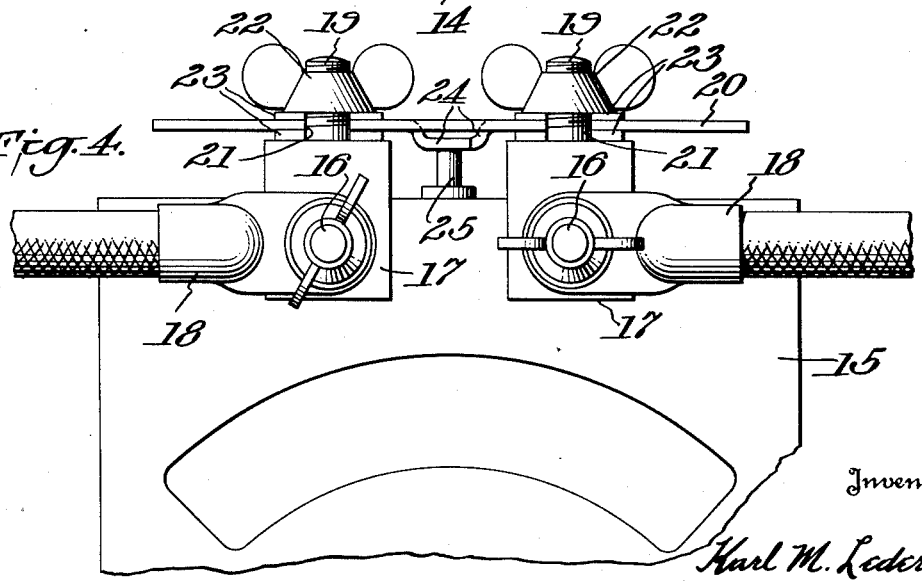
Inventor:
Karl M. Lederer,
By Byrnes, Townsend & Potter,
Attorneys.

March 20, 1934.　　　　K. M. LEDERER　　　　1,951,799
AMMETER
Filed July 6, 1932　　　　3 Sheets-Sheet 2

Inventor.
Karl M. Lederer,
By Byrnes, Townsend & Potter,
Attorneys.

March 20, 1934.  K. M. LEDERER  1,951,799
AMMETER
Filed July 6, 1932  3 Sheets-Sheet 3
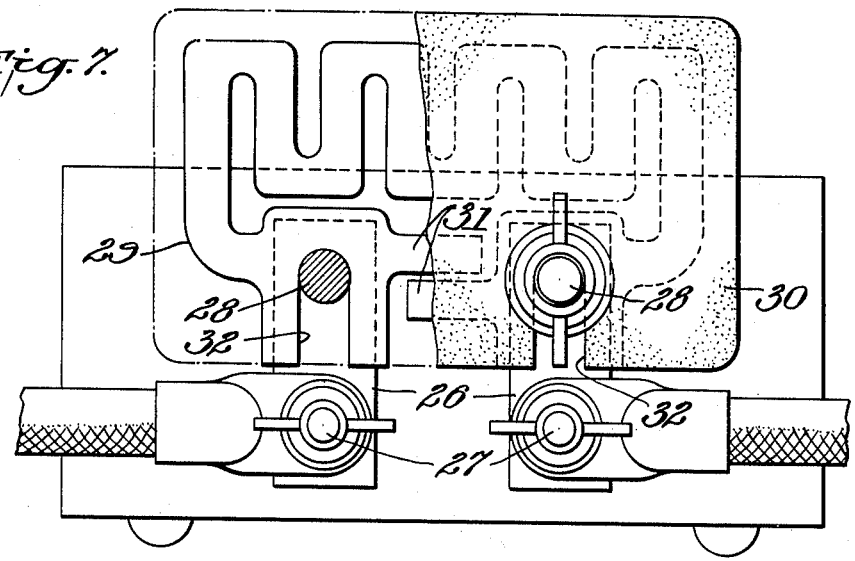
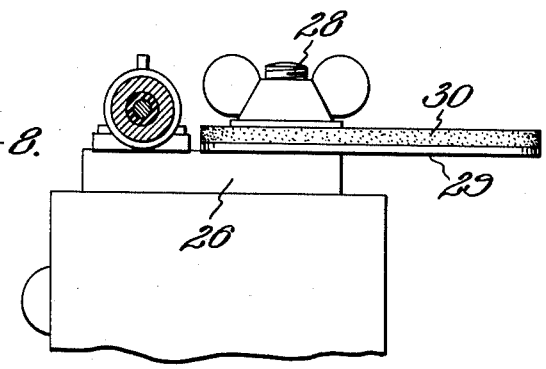
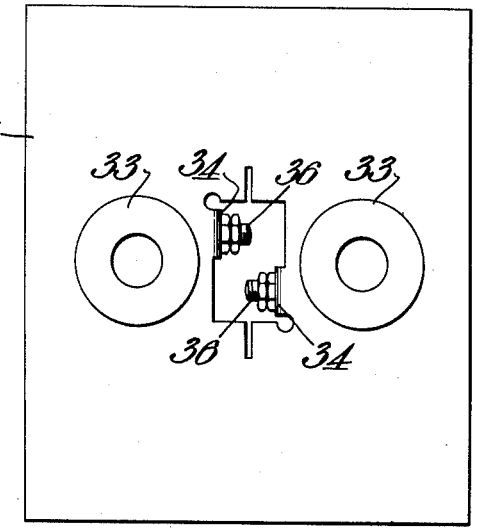
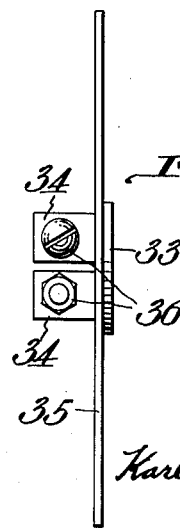
Inventor:
Karl M. Lederer,
By
Byrnes, Townsend & Potter,
Attorneys.

Patented Mar. 20, 1934

1,951,799

UNITED STATES PATENT OFFICE 1,951,799

AMMETER

Karl M. Lederer, Newark, N. J., assignor to Weston Electrical Instrument Corporation, Newark, N. J., a corporation of New Jersey Application July 6, 1932, Serial No. 621,086

16 Claims. (Cl. 171—95)

This invention relates to ammeters of the type employing plate or strip shunts.

In the measurement of current values of different orders of magnitude, the practice is to shunt the ammeter terminals by resistances which bear a definite relationship to the instrument resistance, thus providing two parallel paths for the current flow. It will be apparent that the accuracy of the indications is dependent upon the establishment of the predetermined distribution of the current flow through the shunt and the instrument, and it has been customary to employ carefully assembled multiplate shunts whenever readings of a fair order of accuracy were desired. Shunts of this type have heavy terminal blocks in which the ends of the several parallel blades are secured and, obviously, are not only expensive but are heavy and bulky. A simpler construction which omits the heavy terminal blocks consists of a single plate, usually of rectangular outline, having apertures for fitting the plate upon circuit terminals and having attached terminals for connection to the instrument leads. Shunts of this type are known as "plate" shunts and have the decided advantage of low cost but the designs previously proposed have introduced varying errors of such magnitude as to render them almost useless.

An object of the present invention is to provide an ammeter having a plate shunt, or series of interchangeable plate shunts, and which will retain its accuracy when associated with various circuits and either with or without a change of the shunt. An object is to provide an ammeter having a plate shunt, and in which the shunt is so constructed that a predetermined relationship always exists between the voltage drop across the shunt terminals and the voltage drop across the instrument terminals when the ammeter is connected into a circuit. More specifically, an object is to provide an ammeter having a plate shunt, and in which the circuit and the instrument terminals of the shunt are so formed that substantially the same contact engagement is established when current leads are connected to the shunt, thereby insuring that substantially the same distribution of current flow in the shunt is established whenever the instrument is employed.

A further specific object is to provide an ammeter having main terminals for connection to current leads and including a plate shunt having current terminals offset from the plate proper, the offset portions of the shunt terminals so restricting the contact engagement with the main terminals and/or the current leads that the distribution of current flow in the plate shunt does not vary materially when the current leads and/or the shunt are changed. Further specific objects relate to improvements in plate shunts to render the calibration thereof substantially independent of the instrument and/or the current leads with which the plate shunts are associated.

These and other objects of the invention will be apparent from the following specification, when taken with the accompanying drawings, in which Fig. 1 is a plan view of a panel type of ammeter having a plate shunt, Figs. 2 and 3 are an elevation and a side view, respectively, of the plate shunt, Fig. 4 is a fragmentary plan of a portable instrument provided with another form of plate shunt embodying the invention.

Figure 6:
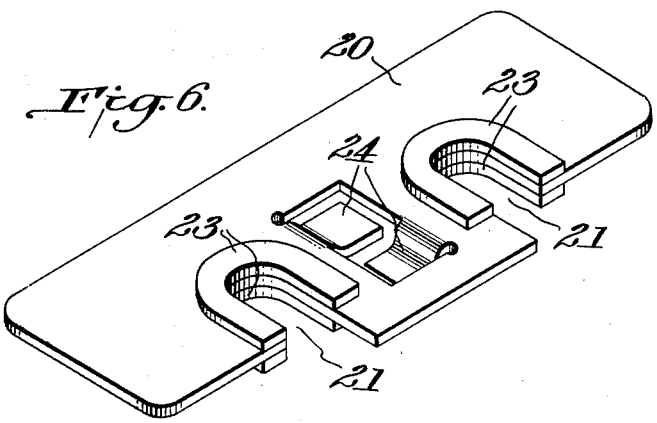

Fig. 5 is a fragmentary perspective, with parts shown in section, of the instrument shown in Fig. 4, Fig. 6 is a perspective view of one of the interchangeable shunts for use with the Fig. 5 ammeter, Figs. 7 and 8 are a rear elevation and fragmentary side view, respectively, of an ammeter which includes a low range shunt, and Figs. 9 and 10 are a plan and end elevation, respectively, of another form of plate shunt embodying the invention.

In Fig. 1, the reference numeral 1 identifies the casing of an ammeter which is mounted on a panel 2, and is provided with a pair of hexagonal or non-circular terminal posts 3 having the usual threaded extensions 4 upon which the flattened contact terminals 5 of the load circuit are secured by nuts 6. A rectangular plate 7 of constant-resistivity material, i. e., a plate shunt is clamped against the hexagonal portion of the terminals 3 by the load circuit terminals 5 and includes a pair of bent tongues 8 which have apertures for receiving the screws 9 that clamp the tongues 8 to the instrument terminals 10. The portions of the plate 7 in contact with the circuit terminal posts 3 and the terminal lugs 5 are hexagonal bosses 11 pressed out of the plane of the plate 7 and of such size as to engage and be guided into a definite position by the hexagonal portion of the terminal posts 3. The projecting faces of these hexagonal bosses 11 limit the contact area between the shunt plate 7 and the lugs 5 to a definite predetermined area which is not dependent upon the relative angular arrangement of the load leads and terminal lugs 5.

The interlocking of the plate 7 to the terminal posts 3, by the cooperating non-circular portions of these elements, is not necessary when the posts 3 are rigidly mounted on the instrument casing but the non-circular recesses on the shunt are very desirable to adapt the shunt plate for mounting on flexible leads which carry bolts or posts having non-circular heads conforming to the shape of the depressions in the shunt plate.

The limited contact areas between the terminal lugs 5 and the contact bosses 11 insure a definite and predetermined distribution of current flow throughout the shunt plate 7. The instrument terminals are also connected across predetermined points on the shunt plate 7 and, for any particular shunt, the ratio of potential drop across the shunt to the potential drop across the tongues or instrument contacts 8 remains constant even though the shunt is transferred from one ammeter to another.

In some cases, and particularly when the contact between the shunt plate and the load circuit terminals is provided by stamping the bosses 11 from the plate, the plate may be provided with slots 12 which restrict or modify the path of the main current between the bosses 11. The calibration of the shunt may be effected by varying the length of one or more of the slots 12, but preferably additional calibration slots 13 are provided and, by extending these calibration slots 13, the path of the main current through the plate 7 is lengthened and the potential drop between the instrument contacts 8 is increased. When the shunt is calibrated for one instrument, no further calibration or adjustment is required when the ammeter is connected into another circuit or when the shunt is employed with other ammeters of the same type.

For low range shunts which will be, in general, formed of relatively thin plates, reinforcing ribs 14 may be provided along the edges of the plate. As shown in Figs. 2 and 3, the main contact bosses 11 and the instrument terminals 8 are arranged at substantially the center line of the shunt plate, and this arrangement is to be preferred but it will be apparent that it is not essential. For any particular ammeter, the shunt plates for obtaining various current ranges will be identical so far as concerns the relative location of the main terminals or bosses 11 and the instrument terminals 8. The spacing between instrument terminals 8 of the plate is made relatively small since, for large capacity shunts, it is necessary to hold the voltage drop as small as possible. The increased cooling surface for the larger capacity shunts is provided by increasing the size of the plate but, as stated above, the same terminal or contact arrangement is retained for all shunts that are to be employed with one ammeter. In preparing a set of interchangeable shunts, the same size of plate may be used for two or more shunts by cutting the slots 13 to a greater depth in the lower range shunt.

This general arrangement may be employed in portable ammeters, but it is more convenient to use constructions which facilitate the interchange of the shunt plates. As shown in Figs. 4 and 5, the ammeter case 15 is provided with posts 16 projecting from L-shaped lugs 17 against which the line terminals 18 may be clamped. The lugs 17 have bolts 19 fixed thereto and the shunt plate 20 is notched, as at 21, to permit insertion or removal of a shunt without removing the clamping nuts 22 from the bolts. Washers or U-shaped flanges 23 are brazed to the plate 20 at the edges of the notches 21 to provide the raised surface which restricts the contact between the shunt and the current-carrying lugs 17 to predetermined areas, and thus provide a definite path of current flow through the plate. The potential terminals 24 of the shunt plate are arranged between the washers or load current terminals 23, and are engaged by spring-pressed contact terminals 25 of the ammeter. Due to their small size, it is possible to carry a number of shunt plates within the ammeter casing, thus adapting the instrument for use at different current ranges.

For low current ranges, say of the order of less than 50 amperes, the shunt plate preferably takes a form such as shown in Figs. 7 and 8. One end of the ammeter case is provided with a pair of terminal lugs or straps 26 to which threaded posts 27, 28 are fixed for receiving the circuit leads and the shunt plate, respectively. The shunt comprises a thin serrated metal strip 29 which is reinforced by an insulating plate 30. The potential terminals 31 of the shunt plate engage spring contacts mounted in the end wall of the case, in a manner similar to that shown in Figs. 4 and 5. This type of shunt is not provided with raised current terminals, but the walls 32 of the notches which permit the plate to be placed on the bolts 28 have a comparatively snug fit against the bolts and thus insure the desired predetermined distribution of current flow in the shunt.

A somewhat different shunt plate construction may be used when it is not convenient to provide a direct contact between the instrument terminals of the shunt and the ammeter terminals. As shown in Figs. 9 and 10, the relative arrangement and spacing of the current terminals 33 and the instrument terminals 34 of the plate 35 may be substantially the same as that for the shunt shown in Figs. 2 and 3, the difference in the overall size of the shunts being due to the fact that these illustrated shunts were designed for different current ranges. As distinguished from the form previously described, the potential terminals 34 of this type of shunt are bent at right angles to the plane of the plate and provided with some means, such as bolts and nuts 36, for the attachment of leads from the ammeter. The current terminals 33 may be formed by pressing up a portion of the plate but, as best shown in Fig. 10, may take the form of washers that are sweated or brazed to the plate.

The shunt plates are preferably formed of a constant-resistivity alloy, such as manganin, and, when washers or bushings are employed as the current terminals of the plate, these may be of copper. To preserve the electrical properties, and also the appearance of the shunts, the terminals are preferably nickel plated. Due to the high temperature coefficient of resistance of nickel, it might be expected that this use of nickel plating at the terminals would introduce substantial errors but it has been demonstrated that this is not the case.

It is to be understood that the invention is not limited to the particular ammeter and shunt constructions herein illustrated and described, as other arrangements may be employed, without departing from the spirit of the following claims, in adapting the invention to other types or forms of ammeters.

I claim:

1. An ammeter having a casing, instrument terminals and load terminals carried by said casing and a plate shunt adapted to be clamped to said load terminals, said plate shunt comprising a single rectangular plate slotted to provide integral potential terminals at the portion of said plate lying between the areas which contact with the respective load terminals.

2. An ammeter having instrument terminals, load terminals located at opposite sides of said instrument terminals, and a plate shunt clamped to said load terminals, said plate shunt comprising a single plate slotted to provide integral contact tongues for electrical connection to said instrument terminals.

3. The invention as set forth in claim 2, wherein said plate is provided with offset surfaces restriting the contact with said load terminals to define predetermined areas.

4. An ammeter comprising a casing having instrument terminals, load terminal posts of non-circular cross-section, a plate shunt comprising a single plate having depressed portions adapted to fit upon and snugly engage the non-circular portions of said posts, means adapted to receive and clamp load circuit leads against the opposite or protruding surfaces of said depressed portions, and potential terminals formed in said plate between said depressed portions of said plate shunt, said potential terminals being adapted to be connected to the respective instrument terminals.

5. An ammeter comprising a casing having spring-pressed instrument terminals, load circuit straps on said casing, a plate shunt comprising a single plate, means for clamping said shunt across said straps and in predetermined position with respect thereto, potential terminals on said plate in the zone between the areas thereof which engage said straps, said potential terminals being positioned to engage the respective instrument terminals when said plate shunt is clamped to said load circuit lugs, and terminal posts on said lugs for receiving load circuit leads.

6. The invention as set forth in claim 5, wherein said plate shunt is provided with offset surfaces restricting the contact between said shunt and said lugs to definite predetermined areas.

7. An ammeter comprising a casing, load terminals and instrument terminals carried by said casing, a plate shunt comprising a single plate, means for clamping said plate shunt across said load terminals, and means restricting the contact of said plate shunt and said load terminals to definite predetermined areas, said plate shunt having predetermined contact points for connection to the instrument terminals of said ammeter.

8. An ammeter comprising a casing, load terminals and instrument terminals carried by said casing, a plate shunt comprising a single plate having spaced openings permitting the same to be fitted upon said load terminals, and potential terminals on said plate and between said openings for connection to the instrument terminals of said ammeter.

9. A shunt for use with an ammeter comprising a single rectangular plate having apertures at spaced points to fit upon a clamping means, said plate being slotted to provide potential terminals in the path of current flow between said spaced points.

10. The invention as set forth in claim 9, wherein said plate is provided with offset surfaces adjacent said apertures to restrict the area of contact between said plate and said clamping means to define predetermined areas.

11. The invention as set forth in claim 9, wherein the portions of said plate adjacent said apertures are pressed out of the plane of said plate to provide contact-limiting areas for engagement with said clamping means.

12. The invention as set forth in claim 9, wherein the portions of said plate adjacent said apertures are pressed out of the plane of said plate to provide depressed contact-limiting areas of non-circular contour for interlocking engagement with a clamping means of cooperating non-circular shape.

13. The invention as set forth in claim 9, wherein bushings are secured to one side of said plate to provide regions of greater thickness at the edges of said apertures.

14. The invention as set forth in claim 9, in combination with means mechanically reinforcing said plate shunt.

15. A shunt for use with an ammeter comprising a single rectangular plate having one edge thereof notched to receive clamping bolts, said plate being slotted to provide a pair of oppositely directed potential terminals lying between said notched portions of said plate.

16. The invention as set forth in claim 15, wherein said plate is slotted to provide a tortuous path of current flow between said notched portions, in combination with a plate of insulating material overlying and mechanically reinforcing said slotted shunt plate.

KARL M. LEDERER.